United States Patent
Havlinek et al.

[19]

[11] Patent Number: 5,779,085
[45] Date of Patent: Jul. 14, 1998

[54] EXPANDABLE PIN PLUG FOR AUTOMATED USE

[75] Inventors: Kenneth Havlinek, Trumbull, Conn.; Michele Tesciuba, Houston; Thomas D. MacDougall, Sugar Land, both of Tex.

[73] Assignee: Gas Research Institute, Chicago, Ill.

[21] Appl. No.: 815,059

[22] Filed: Mar. 11, 1997

[51] Int. Cl.$^6$ .................................................. B65D 53/00
[52] U.S. Cl. .......................... 220/234; 220/233; 215/361; 411/45
[58] Field of Search .................................. 220/233, 234; 411/39, 44, 45; 215/358, 361, 364

[56] References Cited

U.S. PATENT DOCUMENTS

| | | |
|---|---|---|
| 2,821,323 | 12/1958 | Lee, II . |
| 3,074,134 | 1/1963 | Buechler ........................ 411/45 X |
| 3,451,583 | 6/1969 | Lee, II . |
| 3,825,146 | 7/1974 | Hirmann . |
| 4,091,841 | 5/1978 | Beneker et al. . |
| 4,375,342 | 3/1983 | Wollar et al. ........................ 411/41 |
| 4,867,333 | 9/1989 | Kolp, Jr. et al. . |
| 5,078,294 | 1/1992 | Staubli .............................. 220/233 |
| 5,160,226 | 11/1992 | Lee . |
| 5,387,065 | 2/1995 | Sullivan ............................ 411/45 X |

FOREIGN PATENT DOCUMENTS 2622871  5/1989  France ............................... 220/234

*Primary Examiner*—Stephen Cronin
*Attorney, Agent, or Firm*—Speckman Pauley Petersen & Fejer

[57] ABSTRACT

This invention is a new device that can be used to plug perforations in materials. This plug comprises a cylinder plug with a tapered bore partially extending through the plug from one end. A cylinder pin that is tapered substantially the same as the plug will fit in the plug after installation is complete. A shear flange surrounds the pin so that when the pin is installed in the plug, the shear flange is against a plug flange. The pin is adhered to the plug by means such as a thin layer of epoxy or glue which allows the pin and plug to be handled as a single component. The pin is designed so that while in this position, there is no significant radial expansion of the plug. The pin has a pattern of holes or grooves that extend the entire length of the pin in order to allow for the expansion of any trapped fluids in the bore of the plug. The pin can have a groove along the outer diameter to allow for easier handling of the pin. The diameter size of these openings are not important, as long as the openings are large enough to resist plugging with debris.

19 Claims, 2 Drawing Sheets

EXPANDABLE PIN PLUG FOR AUTOMATED USE

FIELD OF THE INVENTION

The present invention relates generally to expansion sealing plugs and more particularly to a new, improved and automated single step plugging means for sealing an access opening in materials such as metallic blocks and castings.

BACKGROUND OF THE INVENTION

In the metal working field it is sometimes necessary to drill access holes or passages in a hydraulic block in order to permit internal machining, or to provide means for cross connecting internal fluid carrying passages. It is usually necessary to close off these openings in order to preclude the introduction of foreign matter internally in the part or to preclude fluid leakage. One of the common methods of closing off such access passages has been the forcing of an expansion plug such as the one disclosed in the aforementioned U.S. Pat. No. 2,821,323 into the passage. These expansion plugs are comprised of two components, a plug and a pin. Typically, the access hole is counter-bored to the proper size to accept the manual installation of the plug. Then the pin is carefully positioned over the plug and is forcibly inserted, causing the plug to radially expand into the wall of the access hole.

In well logging, to determine whether there are retrievable resources, the most important parameter that a reservoir engineer uses to manage a well is downhole pressure. Normally, a borehole is logged (pressure measurements and fluid samples) immediately after drilling (open hole) to locate primary and secondary pay zones. However, in the drilling and/or producing of an earth formation borehole, steel casing may be routinely used in one or more sections of the borehole to stabilize and provide support for the formation surrounding the borehole. Cement is also employed on the outside of the casing to hold the casing in place and to provide a degree of structural integrity and a seal between the formation and the casing.

Especially during the production phase, there are various circumstances in which it is necessary or desirable to make one or more perforations through the casing and cement in order to retrieve resources from the formation and to perform tests behind the casing and through the surrounding cement, if present. For example, one proposed technique employs a tool which can be lowered on a wireline to a cased section of a borehole. The tool includes a drilling mechanism for perforating the casing, and testing and sampling devices for measuring hydraulic parameters of the environment behind the casing and/or for taking samples of fluids from said environment. Based on the results of these tests, a decision is made whether to further perforate the well for production or to abandon and plug or reseal the zone. Traditionally, perforations have been plugged with either cement through drill pipes or by elastomeric plugs. Well treatment and plugging can also be done with coiled tubing. With the use of either of these methods, plugging is a difficult, costly, and time-consuming process.

Expansion plugs for use in sealing materials such as metallic blocks and castings have been known since the mid 1950's. U.S. Pat. No. 2,821,323 of Leighton Lee II describes an early plug of this type. Plugs of this type were originally designed for sealing hydraulic system pressures up to 3,000 psi and for withstanding proof pressures up to 12,000 psi and blowout pressures up to between 20,000 and 30,000 psi. However, today hydraulic system pressures have increased substantially and hydraulic component parts are being made of substantially higher strength and substantially harder materials to contain the substantially higher pressures.

Improved expansion plugs have been needed for use with these harder materials and for sealing the higher hydraulic pressures. On reason for this need is that the higher strength and hardness of the component part materials create certain problems. In the past, once the expansion plug was inserted into the material, the expansion plug was locked in place by causing localized deformations in the wall of the material's mounting bore with the peripheral lands and grooves of the plug. However, with the harder, higher strength component part materials and substantially higher hydraulic pressures, prior art expansion plugs have not adequately griped the wall of the plug mounting bore, in part because the plugs no longer cause adequate localized deformations in the harder, higher-strength materials.

One attempt to address the above-stated problem is described in U.S. Pat. No. 4,867,333 to Kolp, Jr. et al. This patent describes a high-pressure pin plug which is useful with high-strength, high-hardness hydraulic component part materials and which is useful with such materials for sealing hydraulic pressures up to 8000 psi or more.

A different method for plugging the drilled perforations is shown in U.S. Pat. No. 5,195,588 (Dave). Using an expanding pin plug, Dave reveals that one can achieve similar results as those listed above. An expanding pin plug works in the following manner: a steel cup is fitted into the casing perforation, then a cylindrical wedge (called the pin) is pressed into the cup which radially expands the cup into the surface of the casing and locks it in place.

The Dave patent does not, however, fully explore the details of how such a mechanism works. For instance, commercially available expanding pin plugs are typically designed for manual insertion and do not easily install or work while immersed in fluid, as is the case while down hole.

There exist a need for an improved pin that can adequately plug perforations in the harder materials. The present invention provides a plug that can adequately plug perforations in the harder materials. The system of the present invention is simple, robust, and can be used in both the plugging mechanism of the down hole wireline tool for plugging perforations as well as in other automated plugging applications.

SUMMARY OF THE INVENTION

An object of this invention is to provide an expansion plug device of novel construction and process that would allow for a full installation without the need for manual intervention.

It is another object of this invention to be able to accomplish the first objective while the entire assemblies are immersed in fluid, which is typically the case while trying to plug a perforated hole in casing within the oil field industry.

This invention is a new plug that can be used to plug perforations in materials. This plug comprises a plug body with a tapered bore partially extending through the plug from one end. A plug pin that is tapered substantially the same as the plug body will fit in the body at the completion of the installation. A shear flange surrounds the pin so that when the pin is pre-installed in the plug body, the shear flange is against a plug flange. This shear flange prevents further installation of the pin relative to the plug during the initial insertion of the plug into the perforation or drilled passage. This flange helps insure that the major thrust of force will not occur until the assembly is properly inserted into the bore. This flange also limits the initial thrust of force on the pin which allows the plug body to fully engage the perforation before the pin further seats into the plug body. After full insertion of the plug body into the formation, the thrust on the pin is increased, which shears the shear flange from the pin and fully installation is achieved.

The pin is adhered to the plug body before installation by means such as a thin layer of epoxy or glue or if desired with a rubber material which allows the pin and plug body to be handled as a single component. The pin is designed so that while in this position, there is no significant radial expansion of the plug. Prior methods partially inserted the pin into the plug with sufficient force to hold the pin in the plug body. The pin can have a pattern of holes or grooves along the outer diameter that extend the entire length of the pin in order to allow for the escape of any trapped fluids in the bore of the plug. Other means to allow passage of fluids can also be implemented such as a center opening. The diameter size of these openings are not important, as long as the openings are large enough to resist plugging with debris.

In order to install the pin and plug body assembly into the hole, a force must be applied to the outer face of the pin/plug assembly. A large chamfer at the end of the plug allows for installation misalignment. As previously mentioned, the shear flange allows the initial force to be applied towards the insertion of the plug into the hole. Ideally, after full insertion has occurred, a larger thrust of force on the pin will shear the flange from pin and completely insert the pin into the plug body. The force to insert the plug can be obtainable for example through the use of relatively light hand tools, or in the automated situation, hydraulically actuated robotics pistons.

DETAILED DESCRIPTION OF THE PREFERRED EMBODIMENT

Figure 1:
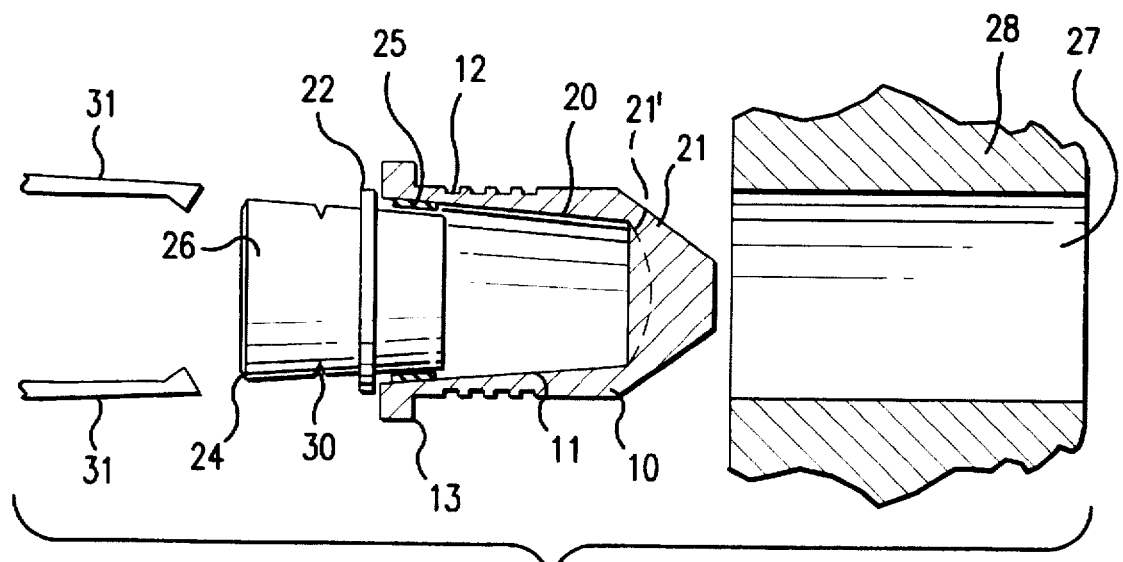
FIG. 1 is an enlarged, longitudinal section view of a pin plug prior to an installation into a target bore.

With reference to FIG. 1, a sealing plug in accordance with a preferred embodiment of the present invention is comprised of a generally frusto-conical plug member 10 of metallic material having an internal, blind and coaxial bore 11. The choice of material may vary depending on corrosion rate concerns. The bore 11 in the plug member 10 has a constant axial taper extending into the plug member down to an inner wall 21'. A series of annular grooves 12 are disposed about the periphery of the plug member 10 for good deformation of the borehole to prevent plug slippage. The plug member also has a flange 13 at the large diameter end, the left end as viewed in FIG. 1 of the tapered bore. The frusto-conical bore 11 extends nearly the entire length of the plug member 10 and has its larger diameter at its outer end and a smaller diameter at its inner end 21'. The target material to be plugged (for instance a borehole casing) 28 has a bore 27 that is slightly larger than the outer diameter of the plug member 10 at the region of the annular grooves 12. The wall 21' at the internal end of the bore 11 can be straight, tapered or curved 21' as indicated by the dotted line in the figure. The tapered wall 21' reduces stress on the plug member at the location where the bore taper 11 meets the end wall 21'.

Figure 2:
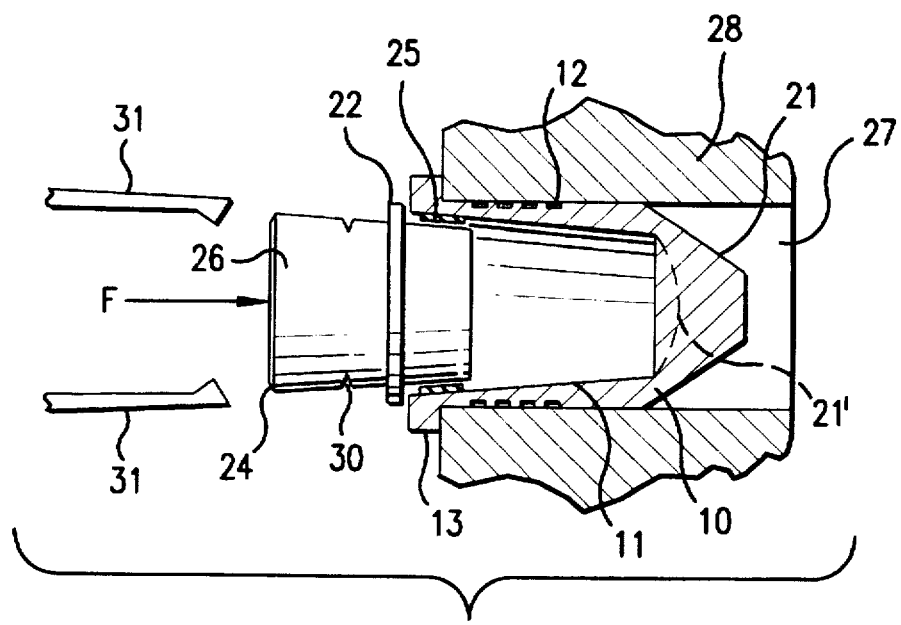
FIG. 2 is an enlarged, longitudinal section view of a pin plug constructed in accordance with the present invention after installation of the plug body, but prior to shearing of the flange on the pin.

FIG. 2 shows the plug as the pin member 26 is being inserted into the plug member. Notice that the plug member is already positioned in the bore 27. The cylindrical pin member 26 can be of the same material as the plug or any metallic material to prevent galvanic corrosion and is provided with a taper substantially the same as the bore 11 of the plug member 10. A small chamfer 24 is provided at the larger diameter end of the pin. The pin is machined with a shear flange when the pin is pre-installed, as viewed in FIG. 1, the shear flange 22 is against the plug flange 13. This shear flange prevents the insertion of the pin inside the plug before the plug is fully inserted into the target bore 27. This flange helps insure that the major thrust of force on the pin will not occur until the plug is properly located in the target bore 27. This assumes that the force required to get the plug in the target bore is smaller than the force required to shear the flange. A groove 30 in the outer surface of pin 26 provides a means of handling the plug/pin assembly such as piston 31 in order to move it from one point to another (not shown except for its resultant force, F) prior to insertion into the plug member 10. A piston 31 can provide the force necessary to insert both the plug member 10 into the bore 27 and the pin 26 into the plug member 10. The piston 31 can engage the pin by the groove 30. A thin layer of epoxy or glue or if desired a rubber material 25 can adhere the pin 26 to the plug member 10 which along with groove 30 allow the pin and plug to be handled as a single component and without the need for human intervention. The pin 26 is designed so that, while in this position, the plug member 10 has not radially expanded significantly.

Due to the desirability of pre-insertion of pin 26 into the plug body, it is generally desirable that the taper angle be approximately equal to or less than that required of pin 26 to be self-holding rather than "self-releasing", as those terms are used by the American National Standard Institute. Therefore, the taper angle of bore 11 is generally less than 0.625 inch per foot of friction of materials used in the pin 26 and plug body are relevant considerations to the self-holding characteristics of the taper angle of bore 11 It is anticipated that variations in the acceptable range of taper angles may occur in the event plastic or composite materials or presently unanticipated materials are utilized in the manufacture of the components of plug 1. Similarly, specific manufacturing methods may affect surface finish and thereby cause the range of acceptable taper angles to vary. The selection of a specific taper angle for bore 11 depends upon consideration of a number of factors including the desired amount of expansion, the taper required to allow for pre-insertion of the expansion member 26 into the bore 11 as well as the coefficient of friction of the materials used. It is possible to vary the axial distribution of the radial expansive force by intentionally "misaligning" the pin 26 within bore 11 such that the taper angle of bore 11 are not the same. In such cases, if the taper angle of the pin 26 is greater than the taper angle of bore 11, then the radial expansive force toward the plug body outer end is increase; and if the taper angle of the pin 26 is less than the taper of bore 11 the radial expansive force toward the plug body inner end 21 is increased. It is to be anticipated that in the event bore 11 is formed with a minimal or non-existent taper such that the inner pin 26 is essentially cylindrical, the pre-insertion of pin 26 into socket 20 would require plug body opening 22 to be modified to provide an enlarged inside diameter to receive and retain pin 26.

Figure 4A:
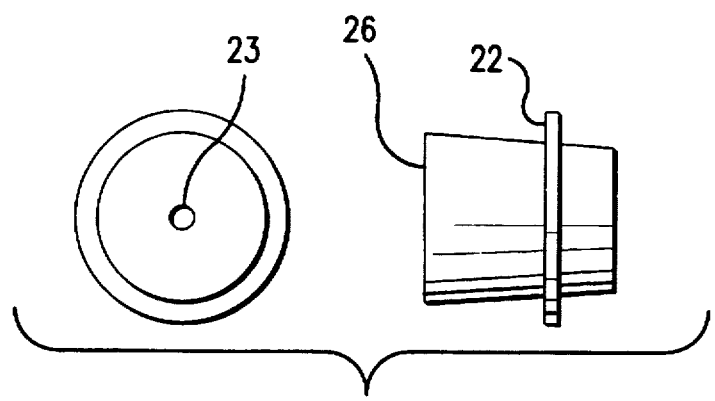
FIG. 4a is a longitudinal and end views of a pin constructed in accordance with the present invention showing a coaxial through hole.
Figure 4B:
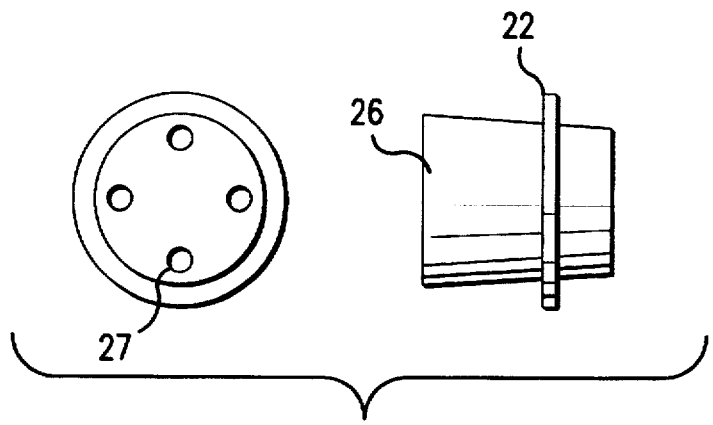
FIG. 4b is a longitudinal and end views of a pin constructed in accordance with the present invention showing a pattern of radial through holes.

The pin should also have a hole 23, pattern of holes 27, as shown in FIGS. 4a and 4b respectively, or axial grooves along the outer diameter that can extend the entire length of the pin in order to allow for the expulsion of any trapped fluids in bore 11 of plug 10. The diameter or size of these openings is unimportant, as long as they are large enough to resist plugging with debris. A large chamfer 21 should be on the leading edge of the plug pin 26 so that proper installation is likely to occur without difficulty. In addition pin 26 is chamfered 24 at the larger end for ease of a plug handling mechanism.

In order to install the pin and plug assembly into the bore 27, a force F is applied to the outer face of the pin 26 as shown in FIG. 2. The large chamfer 21 at the right end of the plug allows for installation misalignment. The force F can be obtainable, for example, through the use of relatively light hand tools, or, in the automated situation, hydraulically actuated robotic pistons (previously referred to as the piston 31).

The plug member 10 is properly and fully inserted in the target bore 27 when the flange 13 is against the face of the target formation 28, as described in the aforementioned U.S. Pat. No. 3,451,583 and shown in FIG. 3. As the force F is increased, the flange 13 prevents any further axial movement and motion of the plug 10. The shear flange 22 is designed such that it and the epoxy 25 shear from the pin 26 at a predetermined force F, which is much higher than the force required to fully insert the plug 10 into the target bore 27. In order to aid in the removal of the shear flange 22, the flange is slotted so that after shearing, the flange becomes two or three pieces and easily fall from the pin.

Figure 3:
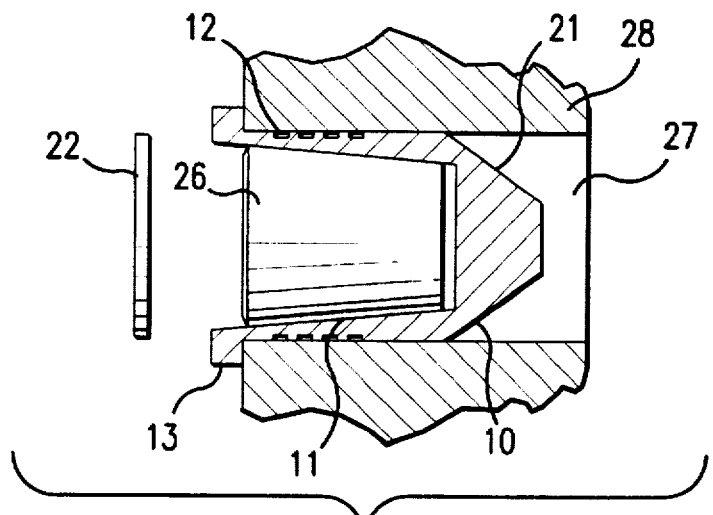
FIG. 3 is a longitudinal section view of a pin plug constructed in accordance with the present invention after full installation.

The pin 26 has a pre-selected overall length such that when the pin is driven into the plug by force F after the shearing of flange 22, its left end, as viewed in the FIG. 3, it is countersunk into the plug 10 a depth equal to or slightly greater than the thickness of the plug flange 13. This is to allow for a secondary process, if desired, of the removal of flange 13 by a shearing action. If this is done, the expendable plug 10 is entirely flush with the bore material 28, yet not structurally weakened. As the pin 26 is being installed, any fluids trapped in the bore 11 can escape through hole 23 or holes 27, as shown in FIG. 4a and 4b, or any axial grooves on the pin 26. The pin 26 also has a preselected end diameter such that when the pin is fully driven into the plug 10, as viewed in FIG. 3, a predetermined expansion of the outer diameter of the plug 10, as previously disclosed in U.S. Pat. No. 2,821,323, will have been brought about.

Thus, it can be seen that this invention provides an expandable plug of novel construction whereby the initial pre-assembly of the pin and plug, the chamfers and flanges, and the diametrical groove in the pin allow for automated single operation installation while immersed in fluid. The method and apparatus of the present invention provides a significant advantage over the prior art. The invention has been described in connection with the preferred embodiments. However, the invention is not limited thereto. Changes, variations and modifications to the basic design may be made without departing from the inventive concept in this invention. In addition, these changes, variations and modifications would be obvious to those skilled in the art having the benefit of the foregoing teachings contained in this application. All such changes, variations and modifications are intended to be within the scope of the invention which is limited by the following claims.

We claim:

1. An expandable plug, adapted to be mounted in a plug mounting bore in a material for sealing said material at high pressure comprising:

a) a plug body having an axially spaced inner end wall, a coaxial bore extending between an outer end of the plug body and the inner end wall, the coaxial bore having a tapered bore section with a larger diameter end at its outer end, said tapered bore section forming a socket;

b) a plurality of axially spaced annular grooves and lands along an external portion of the plug body;

c) a tapered plug pin adapted to be driven into the socket to expand the plug body into locking engagement with a wall of a plug mounting bore, the tapered plug pin having a surface tapered approximately the same as the tapered bore of the socket and a diameter larger than the diameter of the socket to substantially uniformly expand said peripheral lands of the plug body into engagement with the wall of the plug mounting bore; and d) a shear flange surrounding the plug pin and positioned so that it is flush with the plug outer end with a small amount of pre-installation of the pin to allow for sequential installation of the expandable plug pin.

2. The expandable plug of claim 1 wherein said inner end of said bore has a tapered shape to reduce force in the inner plug body.

3. The plug of claim 1 further comprising a flange at the outer end of said plug body.

4. The plug of claim 1 wherein said plug pin has a chamfered outer edge so that an installation device can more easily secure said pin prior to insertion of said plug into a target bore.

5. The plug of claim 1 wherein said inner edges of said plug body are chamfered so that the plug can automatically shift and align with said bore, when misaligned with the target bore, as the installation device applies the necessary force for full installation.

6. The plug of claim 1 wherein said plug pin has a groove in its outer surface to facilitate securing said plug prior to installation of said pin into said plug body bore.

7. The expandable plug of claim 1 further comprising an adhesive means for temporarily securing said plug pin to the inner surface of said plug body thereby allowing said plug body and plug pin to be handled as one piece prior to and during installation.

8. The expandable plug of claim 7 wherein said plug body has a plurality of axially spaced annular grooves and lands along an external portion of said plug body that forms the socket.

9. The plug of claim 7 wherein said plug pin has a centralized channel through said plug pin to allow fluid trapped in said bore to escape from said plug pin.

10. The plug of claim 7 wherein said plug pin has a pattern of channels in said plug pin to allow fluid trapped in said bore to escape from said plug pin.

11. The plug of claim 7 wherein said adhesive means is an epoxy material placed on said plug pin surface at approximately the smaller diameter end of said plug pin surface.

12. The plug of claim 7 wherein said adhesive means is a rubber material placed on said plug pin surface at approximately the smaller diameter end of said plug pin surface.

13. The plug of claim 7 wherein said pin is installed in said plug body such that said pin is recessed within the plug greater than or equal to the thickness of the plug flange so that the plug flange can be removed via a shearing action with out damaging the pin.

14. The plug of claim 7 wherein said plug pin is vented to allow fluid trapped in said bore to escape from said plug.

15. The plug of claim 14 wherein said plug pin has a plurality of surface grooves to allow any fluid trapped in said bore to escape from said plug pin.

16. An expandable plug, adapted to be mounted in an opening in a material for sealing said material opening comprising:
   a) a plugging means to seal said material opening and having a plurality of grooves on an outer surface thereof;
   b) an expansion means, said expansion means inserted into said plugging means for expanding said plugging means in said material opening, thereby providing an enhanced seal of said material; and
   c) a sequencing means attached to said expansion means to regulate the sequence of applying force to said expansion means during the insertion of said expansion means into said plugging means; and
   d) adhesive means for temporarily securing said expansion means to said plugging means thereby allowing said plugging means and said expansion means to be handled as one piece prior to and during installation.

17. The plug of claim 16 wherein said expansion means is vented to allow fluid trapped in said plugging means to escape from said plugging means.

18. The plug of claim 16 wherein said expansion means has a at least one channel through said expansion means to allow fluid contained in said plugging means to escape from said plugging means.

19. An expandable plug, adapted to be mounted in a plug mounting bore in a material for sealing the material at high pressure comprising:
   a) a plug body having an axially spaced inner end wall and a coaxial bore extending between an outer end of the plug body and the inner end wall, the coaxial bore having a tapered bore section with a larger diameter end at its outer end, said tapered bore section forming a socket;
   b) a plurality of axially spaced annular grooves and lands along an external portion of the plug body;
   c) a tapered plug pin adapted to be driven into the socket to expand the plug body into locking engagement with a wall of a plug mounting bore, the tapered plug pin having a surface tapered approximately the same as the tapered bore of the socket and a diameter larger than the diameter of the socket to substantially uniformly expand the peripheral lands of the plug body into engagement with the wall of the plug mounting bore;
   d) a shear flange surrounding the plug pin and positioned so that it is flush with the plug outer end with a small amount of pre-installation of the pin to allow for sequential installation of the expandable plug pin; and
   e) an adhesive means for temporarily securing the plug pin to the inner surface of the plug body thereby allowing the plug body and the plug pin to be handled as one piece prior to and during installation.

* * * * *